United States Patent [19]

Geppert et al.

[11] Patent Number: 4,458,194

[45] Date of Patent: Jul. 3, 1984

[54] METHOD AND APPARATUS FOR PULSE WIDTH MODULATION CONTROL OF AN AC INDUCTION MOTOR

[75] Inventors: Steven Geppert, Bloomfield Hills; James M. Slicker, Union Lake, both of Mich.

[73] Assignee: Eaton Corporation, Cleveland, Ohio

[21] Appl. No.: 318,087

[22] Filed: Nov. 4, 1981

[51] Int. Cl.³ .............................................. H02P 5/40
[52] U.S. Cl. ...................................... 318/811; 363/41
[58] Field of Search ........... 363/41; 318/811, 807–810

[56] References Cited

U.S. PATENT DOCUMENTS

| | | | |
|---|---|---|---|
| 3,523,236 | 8/1970 | Howell et al. | 321/9 |
| 3,538,420 | 12/1968 | Klein | 321/5 |
| 3,605,005 | 9/1971 | Stolzy | 321/9 A |
| 3,614,590 | 10/1971 | Kernick | 321/9 |
| 3,781,634 | 12/1973 | Jessee | 321/9 |
| 3,820,003 | 6/1974 | Tappeiner | 363/41 |
| 3,958,171 | 5/1976 | Sekino | 363/41 |
| 3,971,972 | 7/1976 | Stich | 363/41 |
| 4,097,083 | 9/1977 | Plunkett | 363/41 |
| 4,245,290 | 1/1981 | Lipman | 363/41 |
| 4,321,663 | 3/1982 | Krtek | 363/41 |

OTHER PUBLICATIONS

"Introduction to PWM Speed Control System for 3-Phase AC Motors", *Electronic Components and Applications*, vol. 2, No. 2, Feb. 1980, pp. 5–18.
"LSI Circuit for AC Motor Speed Control", *Electronic Components and Applications*, vol. 2, No. 4, Aug. 1980, pp. 32–42.

*Primary Examiner*—David Smith, Jr.
*Attorney, Agent, or Firm*—C. H. Grace; J. G. Lewis

[57] ABSTRACT

An inverter is connected between a source of DC power and a three-phase AC induction motor, and a micro-processor-based circuit controls the inverter using pulse width modulation techniques. In the disclosed method of pulse width modulation, both edges of each pulse of a carrier pulse train are equally modulated by a time proportional to sin Θ, where Θ is the angular displacement of the pulse center at the motor stator frequency from a fixed reference point on the carrier waveform. The carrier waveform frequency is a multiple of the motor stator frequency. The modulated pulse train is then applied to each of the motor phase inputs with respective phase shifts of 120° at the stator frequency. Switching control commands of electronic switches in the inverter are stored in a random access memory (RAM) and the locations of the RAM are successively read out in a cyclic manner, each bit of a given RAM location controlling a respective phase input of the motor. The DC power source preferably comprises rechargeable batteries and all but one of the electronic switches in the inverter can be disabled, the remaining electronic switch being part of a "flyback" DC-DC converter circuit for recharging the battery.

5 Claims, 11 Drawing Figures

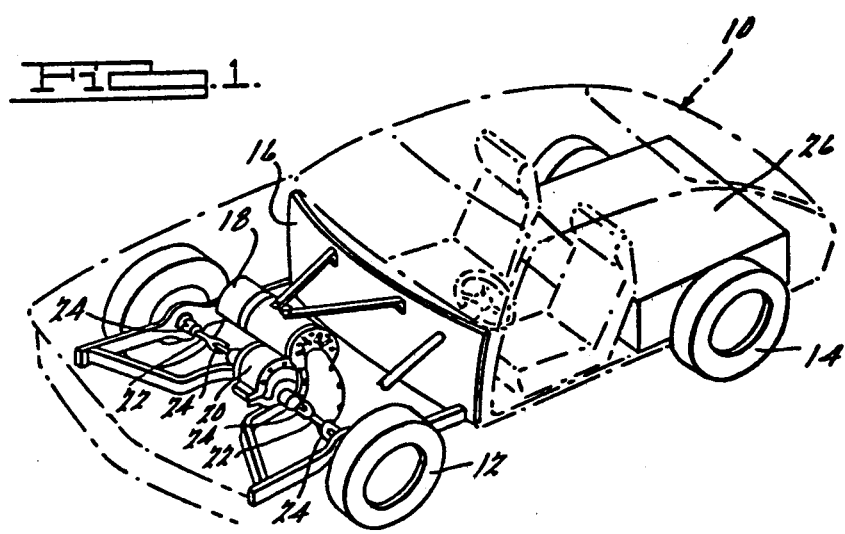
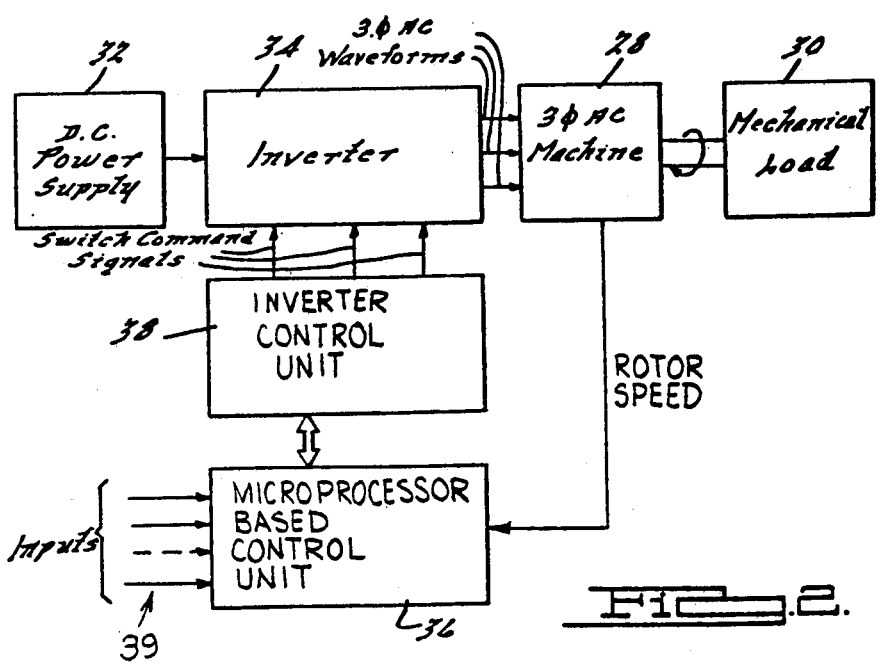

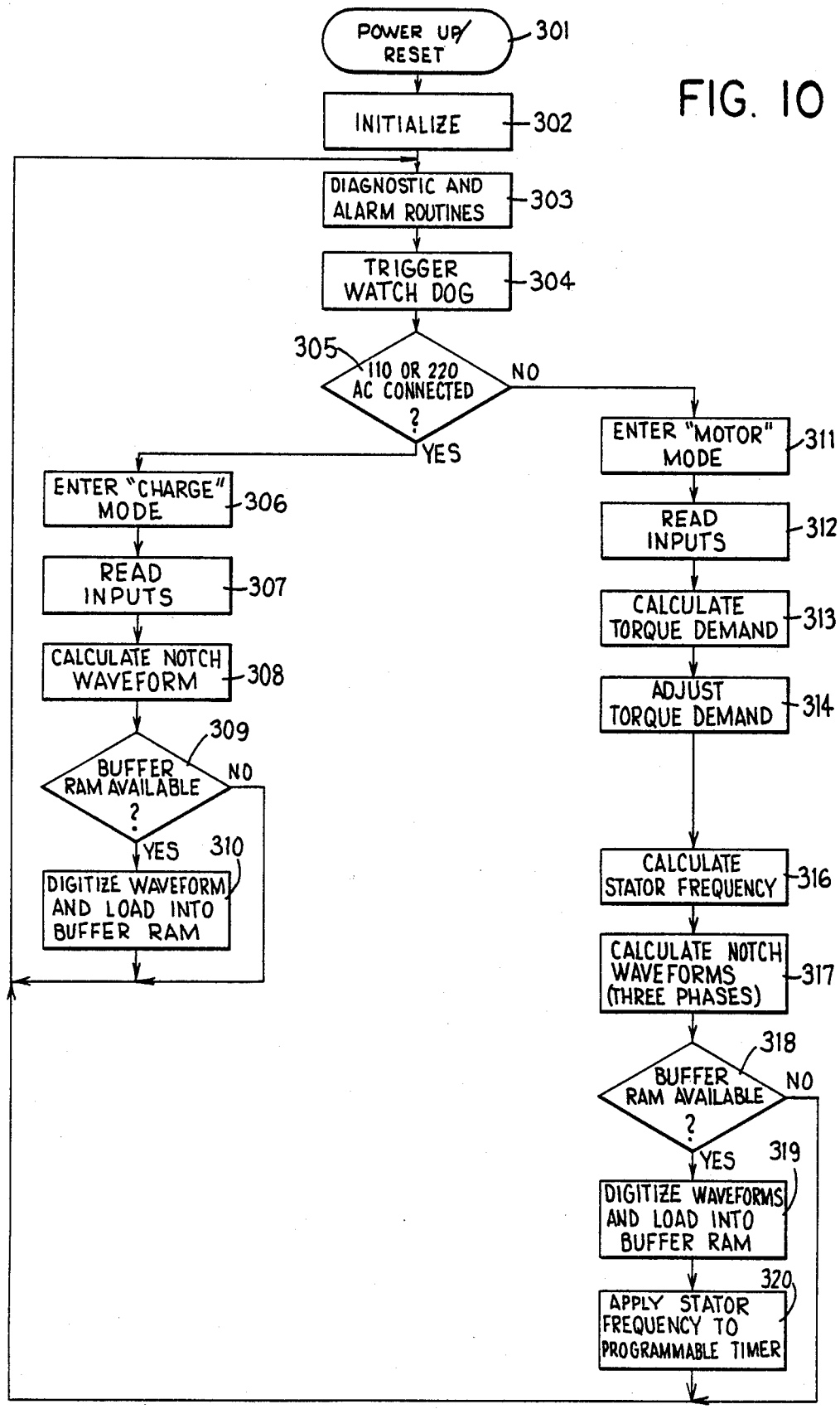

METHOD AND APPARATUS FOR PULSE WIDTH MODULATION CONTROL OF AN AC INDUCTION MOTOR

GOVERNMENT RIGHTS STATEMENT

The government has rights to this invention pursuant to contract No. DEN 3-211 awarded by the U.S. Department of Energy and NASA-Lewis Research Center.

INTRODUCTION

The present invention relates to a method and apparatus for controlling an AC induction machine and, more particularly, to such a method and apparatus which utilizes pulse width modulation control techniques and includes circuitry for recharging a battery powering the AC motor. More specifically, this invention relates to the application of such a method and apparatus to an electrically powered vehicle.

BACKGROUND OF THE INVENTION

The electrically powered passenger vehicle has long been considered one of the most attractive alternatives to vehicles powered by conventional internal combustion engines from the standpoints of overall efficiency, environmental impact and, most recently alternative fuel capability. Many commercial enterprises and private individuals, some under the auspices of the federal government, have proposed various approaches to implementing an electrically powered passenger road vehicle. To date, there have been virtually no such vehicles which have been produced on a large scale.

There have been a number of different approaches to the implementation and control of an electric vehicle. The most attractive approach from the applicant's viewpoint is a vehicle employing a battery bank and an AC induction motor. AC motors are relatively lightweight, inexpensive and easy to manufacture when compared to DC motors. AC induction motors, with no brushes or commutation, are more rugged and reliable than their DC counterparts, and require less maintenance. AC machines can be driven at substantially greater speeds than equivalent power DC motors giving a more attractive power-to-weight ratio. Because AC motors do not generate sparks, they can readily be employed in dusty, explosive and highly humid atmospheres, and at high altitudes. Additionally, AC motors can be liquid cooled if the application so requires.

A prior system utilizing pulse width modulated inverter control of an AC motor in an electric vehicle is disclosed in U.S. Pat. No. 4,316,132, the disclosure of which is incorporated herein by reference. In addition, methods of pulse width modulation control of three-phase AC motors are discussed in an article entitled "Introduction to Pulse Width Modulation Speed Control System for Three-Phase AC Motors", published in "Electronic Components and Applications", Vol. 2, No. 2, Feb. 1980, and in an article entitled "LSI Circuit for AC Motor Speed Control", published in "Electronic Components and Applications", Vol. 2, No. 4, Aug. 1980. The disclosure of these articles is incorporated herein by reference.

Although the known techniques and apparatus for control of AC induction motors, including those disclosed in the application and articles above, have generally proved acceptable for their intended purposes, they have not been satisfactory in all respects.

Accordingly, it is an object of the present invention to provide a method of pulse width modulation for controlling an inverter driving an AC induction motor which provides an average voltage across any two-phase inputs of the motor that varies sinusoidally, which has a minimum of harmonics, which presents a higher effective switching rate to the motor in relation to the inverter switching rate to reduce inverter switching losses, and which minimizes the peak currents flowing through the inverter and AC motor.

It is a further object of the present invention to provide a method of pulse width modulation, as aforesaid, in which the modulation function is relatively simple and can be evaluated quickly and efficiently.

It is a further object of the invention to provide an apparatus which uses pulse width modulation techniques to control an inverter driving an AC induction motor, which apparatus is efficient, is relatively inexpensive to manufacture in production quantities, and is sufficiently rugged and dependable when used in an environment such as a vehicle.

It is a further object of the present invention to provide an apparatus which uses pulse width modulation techniques to control an inverter driving an AC motor, which apparatus includes a battery charger which requires a minimum amount of additional circuitry.

A further object of the present invention is to provide a control apparatus having a battery charger circuit, as aforesaid, in which certain portions of the inverter circuit also function as part of the battery charger circuit.

BRIEF DESCRIPTION OF THE INVENTION

The objects and purposes of the invention, including those set forth above, are met as to one aspect of the invention by providing an apparatus for controlling an AC induction machine utilizing pulse width modulation techniques, which apparatus includes an inverter cooperable with the AC machine and includes an apparatus for controlling the inverter utilizing pulse width modulation techniques. The control apparatus includes a random access memory (RAM) in which switching control commands for electronic switches in the inverter are stored and includes an address generation circuit for successively and cyclically reading out the locations in the RAM at a first rate, each bit of a RAM location controlling the electronic switch for a respective phase input of the motor. A preferred embodiment includes a second RAM into which the switching control commands can be loaded at a second rate, and a control circuit for synchronizing control of the second RAM to the control of the first RAM and effecting a transfer of the information stored in the second RAM to the first RAM at the first rate.

According to another aspect of the invention, the DC power supply is a rechargeable battery and all but one of the electronic switches in the inverter can be disabled by the control circuit. The remaining electronic switch in the inverter is part of a "flyback" DC—DC converter circuit for recharging the battery. In the preferred embodiment, the inverter includes a transformer having three windings, one winding being part of the charging circuit, a second winding serving as a choke to limit inrush current when the electronic switches are turned on during control of the AC motor, and the third winding being an energy recovery winding which accepts energy from the first winding when the battery is being charged and from the second winding when the AC motor is being operated, the recovered energy being returned by the third winding to the battery.

According to a further aspect of the invention, a method of pulse width modulation control of an inverter driving an m-phase AC motor includes the step of equally modulating both edges of each pulse of a carrier pulse train by a time proportional to sin Θ, where Θ is the angular displacement of the pulse center at the AC motor stator frequency from a fixed reference point on the carrier waveform. The modulated pulse train is then applied to the respective motor phase inputs with respective phase shifts of 360°/m at the stator frequency.

A more complete understanding of the objects, purposes and advantages of the invention by persons familiar with apparatus of this general type will result from reading the following specification and inspecting the accompanying drawings.

BRIEF DESCRIPTION OF THE DRAWINGS

In the drawings:

FIG. 1 is a perspective phantom view of an electrically powered vehicle incorporating the present invention;

FIG. 2 is a block diagram of the power system of the vehicle of FIG. 1;

FIG. 10 is a flow diagram of the basic control loop of a program for a microprocessor which is a component of the circuit of FIG. 4.

DETAILED DESCRIPTION

Figure 3:
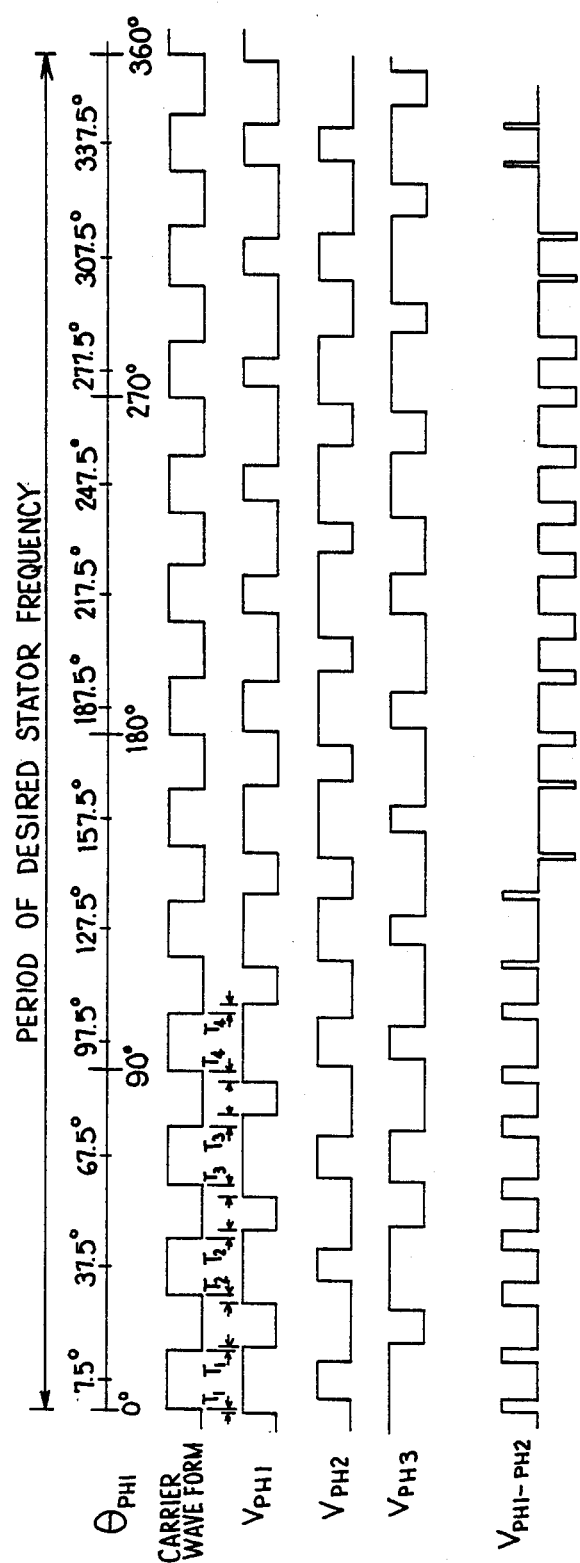
FIG. 3 is a diagram of various waveforms which are generated by the control apparatus of FIG. 2 according to the inventive method of pulse width modulation.

FIG. 1 illustrates a conceptualized packaging of the present invention within an electric vehicle 10. The electric vehicle 10 is conventionally configured, having driven front wheels 12 and freely rotatable rear wheels 14. An engine compartment, comprising the area forward of a firewall 16, contains a transversely mounted three-phase AC induction motor 18 which drives wheels 12 through a two-speed transmission 20, drive shafts 22 and interconnecting universal joints 24. Certain details, such as the front suspension, have been omitted for the sake of simplicity. The mounting of motor 18 and transmission 20 as well as the independent front end suspension of the vehicle 10 is so well known in the art as to require no elaboration here.

A ventilated compartment 26 disposed within the vehicle 10 behind the driver and passenger seats contains a 192 VDC battery pack as well as an inverter and most of the control circuitry. The motor 18 and compartment 26 are electrically interconnected by appropriate cables (not illustrated). Additionally, provision must be made to periodically connect the vehicle 10 with a source of charging current, such as standard 110 VAC power as is available at the owner's home. For purposes of convenience it will be assumed that the two-speed transmission 20 is of the type having a self-contained shift control unit, but it will be recognized that the control circuitry for the AC motor 18 could control shifting of the transmission 20. In some applications, the transmission 20 could be omitted entirely and the AC motor connected directly to differential gearing for the wheels 12.

The present invention can be applied to applications other than electric vehicles. FIG. 1 is intended only as an aid in conceptualizing one example of the packaging of the invention as it may appear in a typical commuting passenger vehicle. The details of the arrangement in FIG. 1 are therefor not to be considered limiting.

Referring to FIG. 2, a simplified block diagram of the present invention is illustrated. A three-phase AC induction machine 28 drives a mechanical load 30 and is energized by a DC power supply 32 through an intermediate voltage-source type inverter 34. The DC power supply is the 192 VDC traction battery mentioned above. Inverter 34 converts the DC voltage and current from power supply 32 into three-phase AC waveforms. Inverter 34 receives switch command signals from a microprocessor based control circuit 36 through an intermediate inverter control circuit 38. The characteristics of the three-phase AC waveforms are determined by the switch command signals, which in turn are derived from a plurality of parametric inputs 39 into control circuit 36.

In generating the switch command signals, control circuit 36 employs a technique known as waveform notching. The general concept of waveform notching is well known in the art and is, for example, described in detail in U.S. Pat. No. 3,538,420, which issued Nov. 3, 1972 to F. N. Klein and is incorporated herein by reference. Refinements of this technique of waveform notching are described in an article entitled "Introduction to PWM Speed Control System for Three-Phase AC Motors", published in "Electronic Components and Applications", Vol. 2, No. 2, Feb. 1980, and in an article entitled "LSI Circuit for AC Motor Speed Control", published in "Electronic Components and Applications", Vol. 2, No. 4, Aug. 1980. One feature of the present invention is a further improvement in these known techniques of waveform notching.

Figure 4:
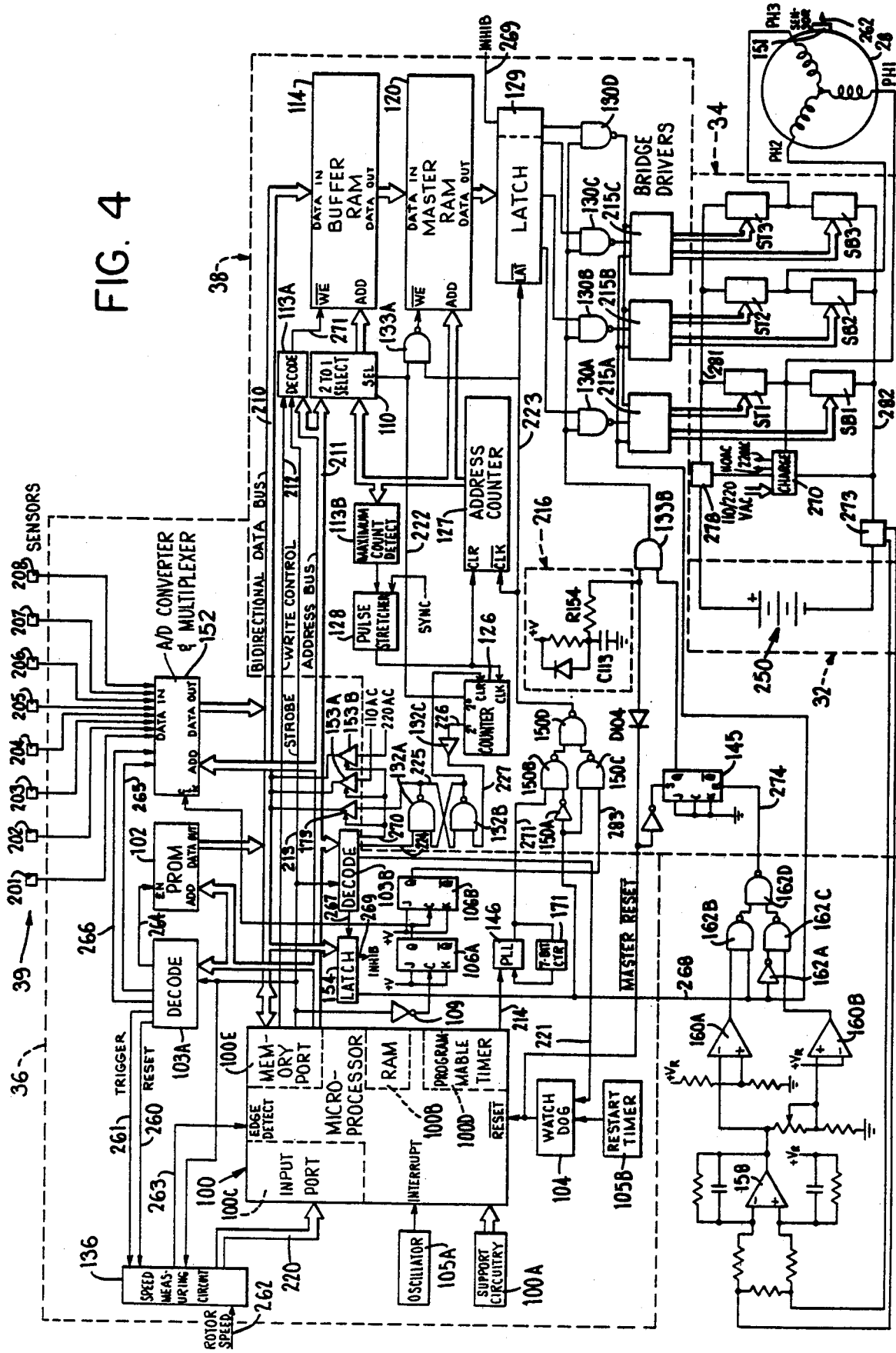
FIG. 4 is a detailed schematic diagram of the power system of FIG. 2.

Referring to the lower right corner of FIG. 4, the circuitry of the inverter 34 of FIG. 2 is illustrated in a simplified, conceptual form. The inverter 34 includes six electronic switches ST1, ST2, ST3, SB1, SB2 and SB3. Switches ST1 and SB1 are connected in series across the DC power supply 32 and a phase winding input PH1 of the AC motor 28 is connected to a point between the switches ST1 and SB1. The switches ST2 and SB2 are connected in a similar manner with respect to the DC power supply 32 and to phase winding PH2, and switches ST3 and SB3 are connected in a similar manner with respect to the DC power supply and to phase winding PH3. The switches ST1–ST3 and SB1–SB3 are each controlled by the inverter control unit 38 (FIG. 2) in a manner described in greater detail hereinafter. For the moment, it is important only to understand that the switches of a given pair are controlled in a complementary manner. For example, when switch ST1 is closed, switch SB1 will be open, and when switch SB1 is closed, switch ST1 will be open. In this manner phase winding PH1 can be alternatingly connected to the power buses 281 and 282 which are driven by respective terminals of the DC power supply 32.

Control of the AC motor 28 is optimized when the voltage difference between any two of the phase winding inputs PH1, PH2 and PH3 varies substantially sinusoidally at a desired frequency, with a minimum of harmonics. In particular, it is desirable that low order harmonics, especially the fifth, seventh, eleventh and thirteenth harmonics, be minimized. Higher order harmonics are also undesirable, but the AC induction machine 28 is typically less responsive to these harmonics than to lower order harmonics.

According to the present invention, the switches ST1-ST3 and SB1-SB3 are switched in a sequence which produces at PH1, PH2 and PH3 the respective voltage waveforms VPH1, VPH2 and VPH3 which are illustrated in FIG. 3. As can be seen from the waveform at the bottom of FIG. 3, these waveforms produce a voltage between phase inputs PH1 and PH2 which has a sinusoidally varying average value, due to the varying amounts of energy transmitted by the varying pulse widths.

The microprocessor based control unit 36 (FIG. 2) determines the switching sequence for switches ST1 and SB1 which produces the waveform VPH1 of FIG. 3 in the following manner. A desired stator frequency for the motor 28 is determined, based on the actual frequency of its rotor and the torque demanded from it, as discussed in greater detail below. The period of this desired stator frequency is illustrated at the top of FIG. 3. A carrier waveform is then generated which, as illustrated in FIG. 3, is a square wave pulse train having a 50% duty cycle. The frequency of the carrier waveform is selected to be 3 N times the desired stator frequency, where N is an integer. In the FIG. 3 example, N is equal to 4, such that the frequency of the carrier waveform is 12 times that of the desired stator frequency.

An arbitrary reference point on the carrier waveform is then selected, in this case the leading edge of the first illustrated pulse of the carrier waveform, and the function sin Θ is then evaluated at the center of each pulse of the carrier waveform, where Θ is the angular displacement of the pulse center from the selected reference point at the desired stator frequency. The values of Θ used to produce the waveform for phase input PH1 are shown in FIG. 3. Both edges of each pulse of the carrier waveform are then modulated by a time $T_n$ which, for a given pulse, is proportional to the associated value of sin Θ. Since the value of sin Θ will be positive when Θ is between 0° and 180°, the edges of each pulse having a value of Θ between 0° and 180° will be moved equal distances away from each other, making the pulse wider than the associated pulse of the carrier waveform. Similarly, when Θ is between 180° and 360°, the value of sin Θ will be negative, and the edges of each pulse having a value of Θ between 180° and 360° will be moved toward each other, making pulse narrower than the associated pulses of the carrier waveform, as illustrated in FIG. 3.

The waveforms for phase inputs PH2 and PH3 are identical to the waveform for phase PH1, except that the waveform for phase PH2 lags the waveform for phase PH1 by 120° and the waveform for phase PH3 lags the waveform for phase PH1 by 240°. These waveforms can be produced either by delaying the waveform for phase input PH1 by an appropriate period of time, or by modulating each pulse of the carrier waveform in a manner similar to that described for the PH1 waveform but using values of Θ obtained by adding 120° and 240° to each of the values of Θ used for the waveform for phase input PH1. Since the waveforms VPH1, VPH2 and VPH3 are all generated from the same carrier waveform, the center of each pulse of waveform VPH1 will always be aligned with the centers of the corresponding pulses of waveform VPH2 and VPH3.

A result of using a common carrier waveform to produce the three-phase waveforms by equally modulating both edges of each pulse of the carrier waveform by three respective values is that the effective frequency of the motor voltage waveform, shown at the bottom of FIG. 3, is twice the switching rate of any given switch in the inverter. In other words, it is twice the carrier frequency. Accordingly, the lowest frequency of harmonics in the motor, aside from the fundamental stator frequency, is twice the carrier frequency.

The desired stator frequency and the time $T_n$ by which each edge of a pulse of the carrier waveform is modulated are determined in the following manner. First, the torque demand TRQDM of the AC motor 28 is determined, based on parameters relating to the particular environment in which the AC motor 28 is used. Where the motor is used in a vehicle, for example, torque demand would typically depend on factors such as the position of the accelerator pedal. Associated with each value of torque demand is a unique volts per hertz value VPHZ established by the physical characteristics of the particular motor 28, which is most easily determined by employing a look-up table which contains a cross-listing of torque demands and volts per hertz values. The VPHZ values reflect the fact that the average voltage applied to an AC motor must be varied in proportion to the frequency to maintain a constant motor flux. VPHZ may be boosted slightly at low frequencies, if desired, to optimize performance. Further, the frequency of rotation FR of the rotor of the AC motor 28 is measured. The requisite stator frequency FS can then be calculated using the following equation:

$$FS = \frac{K_s \times TRQDM}{VPHZ^2} + FR$$

where $K_s$ is a predetermined constant.

The time $T_n$ is then calculated according to the following equation:

$$T_n = \tfrac{1}{2} K_n \sin\theta \left( \frac{FS \times VPHZ \times \pi}{V_{l-l} \times \sqrt{6}} \right)$$

where $V_{l-l}$ is the maximum allowable average voltage between any two of the phase inputs PH1, PH2 and PH3 of the motor 28, $K_n$ is a constant for a given carrier frequency, which is a multiple of the stator frequency FS, and sin Θ is determined for a given pulse of the carrier wave in the manner described hereinabove.

FIG. 4 is a more detailed schematic representation of the circuitry in the block diagram of FIG. 2. In general, the circuitry of FIG. 4 is powered by a conventional and not illustrated power supply which is itself powered by the conventional and not illustrated 12 volt battery of the vehicle electrical system. In FIG. 4 and in other figures illustrating circuit schematics, the illustrated components are interconnected in the manner shown.

The microprocessor based control unit 36 includes a conventional microprocessor 100 and the conventional circuitry 100A required to support it, such as a crystal-based oscillator which provides the microprocessor 100 with a square wave clock signal. The microprocessor used in the preferred embodiment is an MC 6801-1, manufactured by Motorola Semiconductor Products, but almost any commercially available microprocessor could be used instead. The microprocessor 100 includes a small random access memory 100B (RAM) where the microprocessor can store data during calculations, a programmable timer 100D, an input port 100C through which the microprocessor can read several inputs, and a memory port 100E through which the microprocessor can send and receive binary data from various devices across a bidirectional data bus 210 under the control of an address bus 211, a write control line 212 and a strobe line 213.

The memory port 100E operates in a conventional manner. Namely, the microprocessor places the binary address of the memory location it wishes to access on the multi-wire address bus 211, uses the write control line 212 to indicate whether the location is to be read or written, and places binary data on the data bus 210 if the location is being written or looks for binary data on the data bus 210 if the location is being read.

The strobe line 213 is used for timing, for example to define the period of time when data on the data bus 210 is valid and should be accepted by a location being written. In the preferred embodiment based on the Motorola MC6801-1, the strobe line carries a waveform having a frequency of 1.228 Mhz. It is connected through an inverter 109 to the clock input of a J-K flip-flop 106A. The Q output of flip-flop 106A is connected to the clock input of a J-K flip-flop 106B, and to an analog to digital converter and multiplexer 152 which is discussed hereinafter. The J and K inputs of flip-flops 106A and 106B are all tied high, such that each flip-flop changes state each time it receives an input clock. The waveforms at the outputs of the flip-flops thus have frequencies which are one-half the frequency of the input clock. More specifically, the output of flip-flop 106A will have a frequency of 614.4 Khz and the output of flip-flop 106B will have a frequency of 307.2 Khz.

The programmable timer 100D is a special feature of the Motorola MC6801-1 microprocessor which allows the microprocessor 100 to be used to generate an output waveform on a line 214 at a selected frequency. Other commercially available microprocessors can generate an equivalent waveform using an output port, although the associated program might have to be slightly more complex.

The line 214 driven by the programmable timer 100D is connected to one input of a phase locked loop 146, which is preferably a 4046B integrated circuit manufactured by Motorola Semiconductor Products. The output of the phase locked loop 146 is connected to the clock input of a 7-bit binary counter 171, and the most significant bit of counter 171, which will have a frequency 1/128 the frequency at its clock input, is connected to a second input of the phase locked loop 146. The counter 171 is preferably a 4024B integrated circuit manufactured by Motorola Semiconductor Products. The phase locked loop 146 and counter 171 in effect provide a waveform on line 271 having a frequency 128 times the frequency of the waveform on line 214.

Address decoders 103A and 103B are each connected to the address bus 211 and to the strobe line 213. Each monitors the address bus 211 for the occurrence of any of several predetermined addresses and to respond to the presence of such an address by producing a corresponding output. Each of decoders 103A and 103B can be implemented with several conventional gates and/or a conventional decoder, such as the 74LS138 manufactured by Texas Instruments, Inc.

A conventional rotor speed sensor 151 is provided on the AC motor 28. In the preferred embodiment, this speed sensor includes a disk securely mounted on the rotor shaft and having a plurality of teeth on the peripheral edge thereof, and a magnetic pickup supported adjacent the peripheral edge of the disk. The pickup is responsive to passing teeth of the disk for producing a pulse train having a frequency which is directly proportional to the rotor speed. This pulse train is connected to an input of a speed measuring circuit 136, several outputs 220 of which are connected to the input port 100C of the microprocessor system 100.

Figure 5:
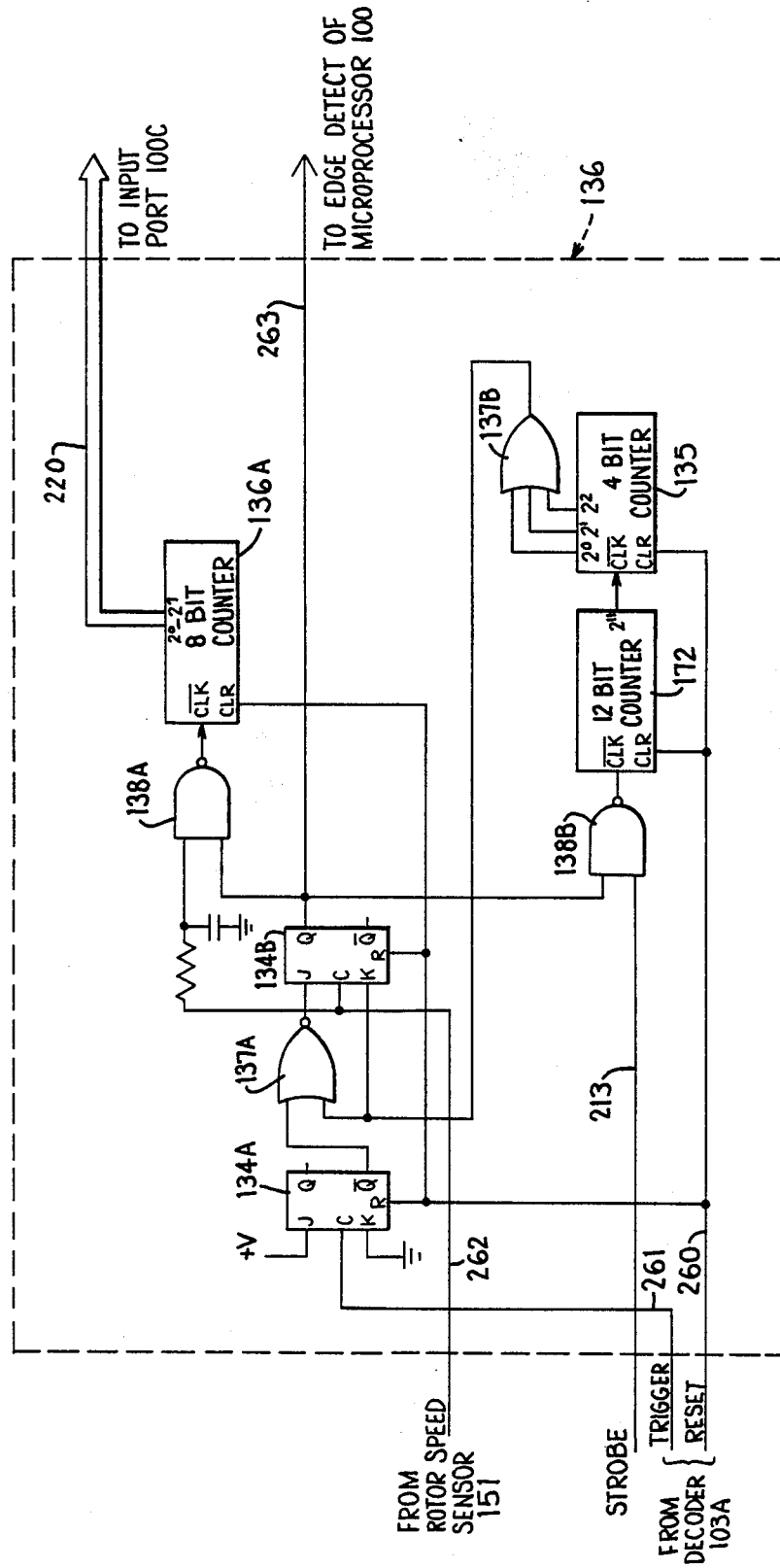
FIG. 5 is a schematic diagram of an exemplary circuit which is part of the power system of FIG. 4.

An exemplary implementation of the speed measuring circuit 136 is illustrated in FIG. 5, and includes flip-flops 134A and 134B which are preferably a 4027 chip manufactured by Motorola Semiconductor Products, an 8-bit binary counter 136A which is preferably a 4520 chip manufactured by Motorola Semiconductor Products, a 12-bit binary counter 172 which is preferably a 4040 chip manufactured by Motorola Semiconductor Products and a 4-bit counter 135 which is preferably a 4520 chip manufactured by Motorola Semiconductor Products.

Referring to FIGS. 4 and 5, when the microprocessor 100 needs to determine the speed of the rotor of the AC motor 28, it places on the address bus 211 an address which causes the decoder 103A to lower line 260, which resets flip-flops 134A and 134B and counters 135, 136A and 172. The microprocessor 100 then places on the address bus 211 an address which causes the address decoder 103A to raise line 261, thereby clocking flip-flop 134A and causing it to set. The output of flip-flop 134A which is connected to gate 137A is thus lowered, and the output of gate 137A thus goes high and enables the J input of flip-flop 134B. The next leading edge of a pulse on line 262 from the rotor speed sensor 151 will then clock flip-flop 134B and cause it to set, thereby enabling gate 138A so that subsequent pulses from the rotor speed sensor 151 will increment counter 136A. Flip-flop 134B also enables gate 138B, so that pulses on strobe line 213, which in the preferred embodiment carries a square wave pulse train at a frequency of 1.2288 Mhz, increments the 12-bit counter 172 which, each time it wraps around from a count of 4095 to a count of zero, will increment 4-bit counter 135. As soon as 4-bit counter 135 is incremented to a non-zero value, it will raise an input of gate 137A through gate 137B and thus raise the K input of flip-flop 134B, so that flip-flop 134B will reset on the next leading edge of the pulse train from the rotor speed sensor 151 on line 262. When flip-flop 134B resets, it will disable gate 138A so that incrementing of counter 136A ceases, and will lower line 263 which is connected to the edge detect input of the microprocessor 100, thereby indicating to the microprocessor 100 that a count is present in counter 136A. If another conventional microprocessor not having an edge detect input were used, line 263 could be connected to an interrupt port and the microprocessor programmed to respond to level transitions on line 263.

In essence, therefore, counters 172 and 135 define a time window of approximately 3.33 msec, and counter 136A will contain the number of pulses received during this window from the sensor 151 on the AC motor 28. This count is read into the microprocessor 100 from the counter 136A through input port 100C. From this count, the microprocessor 100 can calculate the speed of the rotor of the AC motor 28. In the preferred embodiment, the microprocessor 100 uses speed measuring circuit 136 to measure the speed of the motor rotor each time it is interrupted by oscillator 105A, which is about once every 10 msec. The advantage of this circuit is that highly accurate readings are obtained in a relatively short sample time at both high and low rotor speeds.

A conventional oscillator 105A has its output wired to the interrupt input of the microprocessor 100. The frequency of the oscillator 105A is preferably about 100 hertz, so that the microprocessor 100 is interrupted once every 10 msec. In the preferred embodiment, the oscillator 105A is implemented with a 556 timer chip manufactured by Signetics Corporation.

The control circuit 36 also includes a watchdog timer 104 which is a conventional, retriggerable monostable multivibrator, such as a 4538 chip manufactured by Motorola Semiconductor Products, and is wired to keep its output high for a period of approximately 90 msec after each trigger. An output 221 from the decoder 103B is wired to one trigger input of the watchdog timer 104, and the output of a restart timer 105B is wired to another trigger input of the watchdog timer 104. The restart timer 105B is preferably an oscillator similar to the oscillator 105A but with a much lower frequency, preferably about 1 Hz. The output of the watchdog timer 104 serves as a master reset for the entire system and is therefore wired to several points throughout the system, including the reset input of the microprocessor 100. When the microprocessor 100 is running, it will periodically place on the address bus 211 a predetermined address which causes decoder 103B to momentarily lower line 221 and thereby retrigger the watchdog timer 104. So long as each such pulse occurs within 90 msec of the preceding pulse, the watchdog timer 104 will remain continuously triggered and will not apply a master reset to the system. Should more than 90 msec elapse between two such pulses, something is presumably wrong and, since it has not been retriggered, the watchdog timer 104 will send out a master reset.

So long as the reset is applied to the microprocessor 100, the microprocessor 100 cannot use line 221 to retrigger the watchdog timer 104. The purpose of the restart timer 105B is therefore to get the system out of the reset mode by retriggering the watchdog 104 approximately once each second, thereby removing the master reset for 90 msec and giving the microprocessor 100 an opportunity to re-initialize itself and begin running properly again.

A programmable read-only memory 102 (PROM) contains the program for the microprocessor 100 as well as data tables which the microprocessor can use to look up predetermined values needed for its calculations. In the preferred embodiment, the PROM has 4096 8-bit words and is a 2732 chip manufactured by Intel Corp. The address bus 211 is wired to inputs of the PROM 102. Address decoder 103A monitors the most significant bits of the address bus 211 and, when the state of these bits indicates that the microprocessor is trying to read data from PROM 102, sends an enable signal on a line 264 to the PROM 102. The PROM 102 then responds by taking the data from the specified location and sending it across the data bus 210 to the microprocessor 100.

The address bus 211 is also wired to inputs of the analog to digital converter and multiplexer 152, which is preferably an ADC0809 chip manufactured by National Semiconductor Corporation. Several conventional sensors 201–208 are each wired to inputs of the A/D converter and multiplexer 152. The sensors 201–208 are located at various points in the vehicle 10 and each outputs to the converter 152 a voltage which is proportional to the respective parameter being measured. In the preferred embodiment, the parameters measured include the position of the accelerator pedal, the position of the brake pedal, the voltage, current, and temperature of the DC power supply 32 (FIG. 2), the temperature of the AC motor 28 (FIG. 2), the temperature of heat sinks in the inverter 34 (FIG. 2), and the temperature of the ambient air.

The A/D converter and multiplexer 152 operates in a conventional manner. More specifically, when microprocessor 100 needs to read a parameter measured by one of the sensors 201–208, it outputs on the address bus 211 one of eight predetermined addresses which correspond to the respective sensors 201–208. Decoder 103A detects that one of these addresses is being referenced and lowers line 265, causing the A/D converter and multiplexer 152 to accept three bits of this address from the address bus 211. The microprocessor 100 then returns to its other processing tasks, and the A/D converter and multiplexer 152, using the clock waveform supplied by flip-flop 106A, takes the analog voltage from the one of the sensors 201–208 selected by the three address bits and converts it to a binary number, the magnitude of which is proportional to the voltage from the sensor. After the A/D converter and multiplexer 152 has had sufficient time to effect the analog to digital conversion, the microprocessor 100 will place on the address bus 211 another address which will cause decoder 103A to lower line 266 in order to indicate that the binary number in the A/D converter and multiplexer 152 is being read. The A/D converter and multiplexer 152 will respond by sending the binary number across the data bus 210 to the microprocessor 100.

A conventional latch 154, which is preferably an MM74C373 manufactured by National Semiconductor Corporation, has the data bus 210 wired to its data inputs. The latch 154 serves as an output port through which the microprocessor 100 can raise and lower certain control lines, including line 268 and line 269. To effect this, the microprocessor 100 outputs a predetermined address on the address bus 211 and outputs the desired state of lines 268 and 269 on the data bus 210. The decoder 103D will respond to the address on the address bus 211 by raising and then lowering line 267, causing the data on data bus 210 to be latched into the latch 154, replacing the data previously latched therein. The manner in which line 269 is used for control purposes is described in greater detail hereinafter.

The system illustrated in FIG. 4 is capable of running in a "motor" mode, in which it is controlling the AC induction motor 28, and in a "charge" mode, in which it is charging the traction battery 250 of the DC power supply 32. The microprocessor 100 uses line 268 to indicate to the rest of the system which mode is currently in effect. More specifically, the microprocessor 100 uses latch 154 to raise line 268 when the system is in "charge" mode, and to lower line 268 when the system is in "motor" mode. Line 268 is connected to two similar arrangements of gates 150A–150D and 162A–162D, each of which arrangement serves as a selector. When line 268 is high, indicating "charge" mode, gates 150A–150D select line 283, which is the output of flip-flop 106B, and use it to drive line 223. When line 268 is low, gates 150A ∝ 150D select line 271, which is the output of phase locked loop 146, to drive line 223. Similarly, gates 162A–162D select the output of operational amplifier 160A or the output of operational amplifier 160B to drive line 274, based on whether line 268 is high or low, respectively.

Buffers 173, 153A and 153B each have an output which is connected to a respective line of the data bus 210, and are preferably an MM74C244 chip manufactured by National Semiconductor Corporation. An output line 270 from decoder 103B is wired to one input of each of the respective buffers 173, 153A, and 153B. The other input of buffer 173 is connected to the output of gate 132A by line 225 and the other inputs of buffers 153A and 153B are respectively connected to lines 110AC and 220AC from a charge circuit 270 in the inverter 34. When the microprocessor 100 needs to know the state of one or more of these input signals, it outputs on the address bus 211 a predetermined address, in response to which the decoder 103B lowers line 270 and thereby enables buffers 173, 153A and 153B, each of which responds by sending the respective control signal present at its input across the data bus 210 to the microprocessor 100. The significance of each of these control signals will be described in greater detail hereinafter.

As shown in detail in FIG. 4, inverter control circuit 38 (FIG. 2) includes a buffer random access memory (RAM) 114 and a master RAM 120 which, in the preferred embodiment, are each 2048 words long by 3-bits wide and consist of 2102 integrated circuits manufactured by Intel Corp. As discussed below, only 1920 of the 2048 words in each RAM are used. The address inputs of the buffer RAM 114 are controlled by a 2 to 1 selector 110, which preferably consists of 74LS257A integrated circuits manufactured by Texas Instruments, Inc. The address bus 211 and the outputs of a 12-bit address counter 127 are wired to the data inputs of the selector 110, and a control line 222 from the least significant bit of a counter 126 is wired to the select control input of the selector 110. When line 222 is low, the selector 110 gates the address bus 211 to the address inputs of the buffer RAM 114, and when line 222 is high, the selector 110 gates the outputs of the address counter 127 to the address inputs of the buffer RAM 114. An address decoder 113A monitors address bus 211 and write control line 212 and, when microprocessor 100 places on address bus 211 an address which corresponds to a location in buffer RAM 114 and uses write control line 212 to indicate it is writing data into the buffer RAM 114, address decoder 113A provides a pulse to the write enable input of the buffer RAM 114 on line 271 to strobe the data on data bus 210 into the selected location of buffer RAM 114.

The address counter 127 is constantly clocked and thus incremented by the high frequency pulse train on line 223. A maximum count detector 113B, which is preferably a multi-input NAND gate, continuously monitors the outputs of the address counter 127 and, when a predetermined maximum count is reached, triggers a pulse stretcher 128. The pulse stretcher 128 is preferably a monostable multivibrator designed to output a 900 nanosecond pulse when triggered. This pulse clocks the counter 126 and clears the address counter 127.

A flip-flop consisting of NAND gates 132A and 132B is normally reset, such that the output of gate 132B is high and keeps the counter 126 reset so that the least significant bit of the counter which drives the line 222 normally is low.

The three data outputs of the master RAM 120 are connected to inputs of a latch 129 which is preferably a 4042B integrated circuit manufactured by Motorola Semiconductor Products. Line 269 from decoder 103B is connected to the other input of latch 129. The latch is controlled by line 223 in a conventional manner. More specifically, when line 223 is high, the latch 129 is effectively transparent and will continuously gate data present at its inputs directly through to its outputs. When line 223 goes low, however, the outputs of latch 129 will each be maintained at the state it was in when line 223 went low, regardless of the state of the corresponding input of latch 129. The four data outputs of latch 129 are each wired to an input of a respective gate 130A, 130B, 130C or 130D. The outputs of gates 130A, 130B and 130C are wired to respective bridge drivers 215A, 215B and 215C, which are described in greater detail hereinafter, and the output of gate 130D is connected to all three bridge drivers.

Bridge drivers 215A, 215B and 215C respectively control electronic switches ST1 and SB1, ST2 and SB2, and ST3 and SB3 of the inverter 34. Each bridge driver is designed to switch the associated pair of electronic switches complementarily, such that only one switch of each pair is conducting current at any given time. The junction between each of the respective pairs of switches in the inverter 34 is connected to a respective one of the phase winding inputs PH1, PH2 and PH3 of the AC induction motor 28.

A gate 133B has its output wired to a respective input of each of the gates 130A–130D and will prevent data from passing through these gates to the bridge drivers 215A–215C under certain conditions. First, if the watchdog timer 104 has not been triggered sufficiently regularly by the microprocessor 100 using line 221, it will create a master system reset which, through diode D104, will apply a low to an input of gate 133B, causing the output of gate 133B to go low and disable each of the gates 130A–130D.

Second, a circuit designated by reference numeral 216 is operative when the system is powered up. Capacitor C113, which is preferably approximately 1 microfarad, charges relatively slowly from a positive DC supply terminal $V_t$ of a conventional DC operating voltage supply (not shown) at power-up. The charged capacitor C113, through resistor R154, applies a low to an input of gate 133B while it charges, so that gate 133B disables gates 130A–130D. By the time capacitor C113 has become charged and permits the associated input of gate 133B to go high, power throughout the system will be stable.

Finally, a current sensor 273 is provided in the inverter 34 and is connected in series with the battery 250. The outputs of the current sensor 273 are connected to inputs of an operational amplifier 158, which is preferably a CA3160AE manufactured by RCA. The operational amplifier 158 amplifies the output of the current sensor 273 and it is then applied to an input of an operational amplifier 160A and, through a resistive voltage divider, to an input of operational amplifier 160B. The operational amplifiers 160A and 160B are preferably LM224 integrated circuits, manufactured by National Semiconductor Corporation. A fixed reference voltage is wired to the other input of operational amplifier 160A, and a different fixed reference voltage is wired to the other input of operational amplifier 160B. In effect, operational amplifiers 160A and 160B compare the current measured by sensor 273 to respective reference values in order to determine whether the current flowing into or out of the battery 250 is excessive. As described hereinabove, gates 162A–162D will select the output of operational amplifier 160A in "charge" mode and will select the output of operational amplifier 160B in "motor" mode, thereby applying the output of the selected operational amplifier via a line 274 to the reset input of flip-flop 145. Thus, if the selected one of the operation amplifiers 160A and 160B determines that the input signal thereto controlled by the sensor 273 has exceeded the predetermined reference value, indicating an excessive current flow, it will raise its output and thereby cause line 274 to go high, resetting flip-flop 145. Flip-flop 145 will thus apply a low to the associated input of gate 133B, which in turn will apply a low to a respective input to each of the gates 130A–130D to inhibit data from passing therethrough, thereby causing each of the electronic switches ST1–ST3 and SB1–SB3 to create an effective open circuit. A master reset is required in order to set flip-flop 145 again.

The microprocessor 100 can also disable the bridge drivers 215A–215C directly by using latch 154 to lower the inhibit control INHIB on line 269, which will then be latched into latch 129 and will disable gate 130D. This will cause the output of gate 130D to go high, directly disabling each of the bridge drivers 215A–215C in a manner described hereinafter.

As the vehicle 10 is being driven, the control system for the AC motor 28 operates in substantially the following manner. The master RAM 120 will have been loaded with 1920 3-bit words in a manner described hereinafter.

The address counter 127 is incremented each time it receives a pulse on the line 223 and, when it has reached a count of 1920, the maximum count detector 113B will detect the fact that the address counter has reached the number 1920 and will immediately trigger the pulse stretcher 128, which in turn will immediately clear the address counter 127. The address counter 127 will then begin counting from zero again. In other words, the address counter 127 continuously counts from 0 to 1919 in a cyclic manner because it is immediately reset to zero each time it increments past 1919 to 1920. Since the outputs of the address counter 127 are wired to the address inputs of the master RAM 120, the 1920 3-bit words in locations 0–1919 of the master RAM will be sequentially read out in a cyclic manner and presented to the inputs of the latch 129. More specifically, when the line 223 is high, the location in the master RAM 120 selected by the address in the counter 127 will be output to latch 129 and will be continuously gated through the latch 129. When the line 223 goes low, the data passing through the latch 129 will be latched therein and the address counter 127 will be clocked, thereby incrementing the address therein. As the newly selected location in the RAM 120 is accessed, unpredictable transient signals may be presented to the inputs of latch 129 by the RAM 120, but, since line 223 is low, these signals will be ignored by the latch 129. These spurious signals occur, if at all, within a very short period of time following the clocking of the address counter 127, and the correct data from the RAM 120 will be waiting and stable at the inputs of latch 129 when the line 223 again goes high and this data will be gated through latch 129 and buffers 130A–130C to the bridge drivers 215A–215C. The sequence of bits read from the master RAM 120 will in effect create switching control waveforms at the inputs to bridge drivers 215A–215C, for example like the waveforms shown in FIG. 3, and the three pairs of electronic switches ST1–ST3 and SB1–SB3 in the inverter control circuit 38 will essentially amplify each of these waveforms and supply them to the respective phase windings of the AC motor 28. The frequency of the pulse train provided on line 271 and thus on line 223 is selected by the microprocessor 100 to be 1920 times the stator frequency and approximately 1920 times the rotational speed of the rotor of the AC machine 28. Thus, the period of time required to read out the 1920 words in the master RAM 120 will be approximately equal to the time required for the rotor to make one full revolution. The difference between the rotor frequency and stator frequency is commonly called the slip frequency and is varied in a conventional manner on the basis of the output torque required of the AC motor 28.

In the meantime, the microprocessor 100 will periodically input and evaluate the speed of the rotor and each of the parameters measured by the sensors 201–208. Based on these factors, the microprocessor will, at some point, determine that the three phase waveforms supplied to the AC motor 28 should be modified in order to achieve optimum control. The microprocessor 100 will then formulate a new set of 1920 3-bit words and will deposit each of these words into a respective location in the buffer RAM 114. When this has been completed, the microprocessor 100 will cause decoder 103B to momentarily lower line 224, which is normally high. Lowering line 224 will cause the output of gate 132A to go high and, because the gate 132B has kept the counter 126 cleared, both inputs to gate 132B will then be high and the output of gate 132B will go low. Thus, the flip-flop consisting of gates 132A and 132B will be set, thereby providing within the inverter control circuit 38 a stable indication that the buffer RAM 114 has been loaded with a new set of 1920 words. The flip-flop will remain in this state until these 1920 words have all been transferred to the master RAM 120 in the manner described below. Line 225 is driven by the output of gate 132A and will thus remain low until this transfer of data from buffer RAM 114 to master RAM 120 has been completed, and, by sensing the state of line 225 through input buffer 173, the microprocessor 100 can tell whether or not the transfer has been completed. The microprocessor 100 will not attempt to access the buffer RAM 114 unless it has sensed line 225 and determined it is high. The inverter control circuit 38 is thus free to take control of the buffer RAM 114 and effect the transfer of the data therein to the master RAM 120.

While the microprocessor 100 was loading the buffer RAM 114, the 1920 words in the master RAM 120, as described above, were being cyclically read therefrom in a sequential manner and transferred through latch 129 and buffers 130A–130C to the bridge drivers 215A–215C. The point in time at which the microprocessor 100 finishes loading the buffer RAM 114 and uses line 224 to toggle the flip-flop consisting of gates 132A and 132B could occur at any point during the cycle of the address counter 127. In order to avoid the undesirable effects which might occur if the RAM to RAM transfer began as soon as the load of the buffer RAM 114 was completed, the start of the transfer is synchronized to the cycle of the address counter 127 in the following manner.

The clear input of counter 126 is controlled by the output of gate 132B and will be lowered when the flip-flop consisting of gates 132A and 132B is set, thereby enabling counter 126 to increment the next time it receives a pulse at its clock input. However, nothing will happen until the high to low transition of line 223 which increments the address counter 127 to its maximum count of 1919. The maximum count detector 113B will then trigger the pulse stretcher 128, which in turn will clear the address counter 127 and clock the counter 126. This will cause the counter 126 to increment from binary zero to binary 1, thereby raising line 222, which is controlled by the counter's least significant bit. When line 222 goes high, it causes the 2 to 1 selector 110 to gate the outputs of the address counter 127 to the address inputs of buffer RAM 114 and it enables gate 133A, the output of which is connected to the write enable input of master RAM 120. The address counter 127, which has been reset to zero, will thus be addressing location zero in both the buffer RAM 114 and the master RAM 120. The new contents of location zero in buffer RAM 114 will be read out and presented to the data inputs of master RAM 120. The master RAM 120 will simultaneously access the existing data in its location zero and present it to the inputs of the latch 129, but the latch 129 will ignore this data because its control line, line 223, is still low. When line 223 goes high, both inputs to gate 133A will be high and cause the output of gate 133A to go low, providing a write enable to master RAM 120 which causes the master RAM 120 to store the data word presented at its data inputs into location zero and to output this data to the latch 129. Since line 223 is now high, this data will pass through latch 129 and gates 130A-130C to bridge drivers 215A-215C. When line 223 goes low, the new data for location zero will be latched into latch 129, the output of gate 133A will go high to terminate the write into location zero of the master RAM 120, and address counter 127 will be incremented. The cycle just described will then be repeated for location 1 and each of the remaining 1918 locations in the RAMS 114 and 120.

When the last location in master RAM 120 has been updated, address counter 127 will be incremented to 1920. This will be detected by the maximum count detector 113B and it will trigger the pulse stretcher 128, which in turn will reset address counter 127 and clock counter 126 again. This will cause line 222 to go low and line 226 to go high. Line 226 drives inverter 132C which will lower line 227, causing the output of gate 132B to go high and, since line 224 is normally low, causing the output of gate 132A to go low, thereby effecting a reset of the flip-flop consisting of gates 132A and 132B. Since the output of gate 132B will now be high, it will maintain counter 126 in a reset condition, which in turn will keep line 222 low and cause the 2 to 1 selector 110 to again gate address bus 211 to the address inputs of the buffer RAM 114. Since line 225 is connected to the output of gate 132A, it will now be low also, and the microprocessor 100, by periodically sensing the state of line 225, will soon ascertain that the transfer of data from the buffer RAM 114 to the master RAM 120 has been completed. The microprocessor 100 is thereafter free to again load the buffer RAM 114 with another set of new data words.

Figure 6:
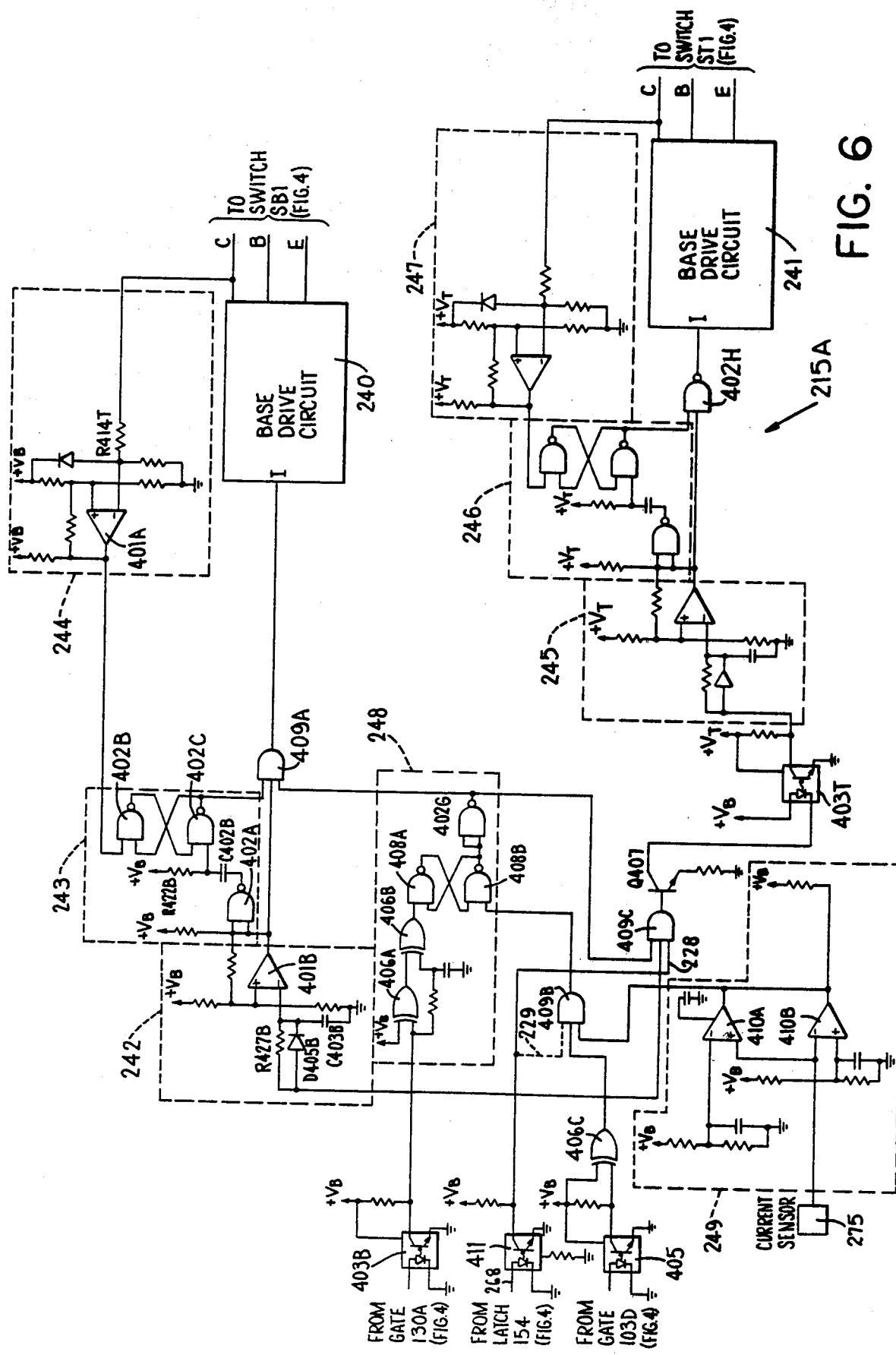
FIG. 6 is a schematic diagram of a circuit which is part of the power system of FIG. 4.

An exemplary circuit for bridge driver 215A of FIG. 4 is illustrated in FIG. 6. The output of gate 130A (FIG. 4) is connected to opto-isolator 403B, which is preferably a 6N136 manufactured by Hewlett-Packard, and signals passing through opto-isolator 403B basically follow one of two paths through the circuit of FIG. 6. First, the output of opto-isolator 403B passes through circuit block 242 and gate 409A to a base drive circuit 240 which drives switch SB1 (FIG. 4). Second, the output of opto-isolator 403B passes through gate 409C, transistor Q407, opto-isolator 403T, circuit block 245, and gate 402H to base drive circuit 241, which controls switch ST1 (FIG. 4). Opto-isolator 403T is preferably identical to opto-isolator 403B. Transistor Q407 and opto-isolator 403T invert signals passing therethrough, as a result of which the switches ST1 and SB1 are switched in a complementary manner under control of the output of gate 130A. More specifically, when base drive circuit 240 has closed switch SB1, base drive circuit 241 will have opened switch ST1, and when base drive circuit 240 has opened switch SB1, base drive circuit 241 will have closed switch ST1.

Control blocks 242 and 245 are substantially identical. Circuit block 242 includes a comparator 401B which is preferably an LM139 integrated circuit manufactured by National Semiconductor Corp. A network consisting of resistor R427B, capacitor C403B, and diode D405B is connected to one input of comparator 401B and the other input is provided with a fixed reference voltage. When the signal entering block 242 from opto-isolator 403B goes high, capacitor C403B will charge quickly through diode D405B, so that the signal will rapidly be presented to and appear at the output of comparator 401B. When the signal from optoisolator 403B goes low, capacitor C403B must charge through resistor R427B, so that a delay of about 10 $\mu$sec will occur as the input to capacitor 401B goes high. Thus, circuit blocks 242 and 245 each delay the falling edge of a signal passing therethrough approximately ten $\mu$sec, but have no such effect on a leading edge of the signal. When a signal passing through block 242 or 245 goes low, it is an indication to the associated base drive circuit 240 or 241 that it is to close the associated switch SB1 or ST1. The reason for delaying the falling edge of the signal is thus to delay slightly the point in time at which the associated switch is closed, ensuring that the other switch of the pair has opened and thereby avoiding a short circuit across the battery 250 through the switches.

As described in greater detail hereinafter, each of the switches SB1-SB3 and ST1-ST3 preferably includes at least one transistor, and each such transistor operates in its region of saturation when the switch is "closed". Circuit blocks 244 and 247 monitor the collector voltages of the transistors of switches ST1 and SB1 to ensure that they are operating in their region of saturation when turned on. Circuit block 244 includes a comparator 401A which is preferably an LM139 integrated circuit manufactured by National Semiconductor Corp. The "+" input of comparator 401A is provided with a fixed reference voltage by a resistor network, and the other input is connected by resistor R414T to switch SB1. Circuit block 244 will produce a signal to circuit block 243 if the transistors of switch SB1 suddenly begin to operate outside their range of saturation. More specifically, circuit block 244 indicates this condition has occurred by dropping its output, which will reverse the state of the flip-flop consisting of gates 402B and 402C in circuit block 243, and thereby pull an input to gate 409A low, causing the base drive circuit 240 to open switch SB1 entirely. Circuit block 243 also includes a gate 402A, the output of which is connected to an input of gate 402C by capacitor C402B and resistor R422B. Each falling edge of the signal at the output of gate 402A produces a momentary low pulse at the input of gate 402C until capacitor C402B can charge up through resistor 422B. This momentary low forces the output of gate 402C high and thus overrides the desaturation protection from circuit block 244 for approximately 5 μsec each time switch SB1 is closed, in order to give the transistors of switch SB1 time to enter their regions of saturation.

Circuit blocks 246 and 247 are substantially identical to, and perform the same functions as, circuit blocks 243 and 244, and are therefore not described in detail.

Circuit block 249 receives a signal from a conventional current sensor 275 provided on the phase input PH1 (FIG. 4) of AC motor 28 and determines whether the current flowing in the lead exceeds a predetermined maximum threshold. More specifically, comparators 410A and 410B, which are preferably LM2903 integrated circuits manufactured by National Semiconductor Corp., each compare the signal to a respective reference voltage established by respective voltage divider networks, one performing the comparison for the positive portion of the motor phase waveform and the other performing the comparison for the negative portion of the waveform. If either threshold is exceeded, the corresponding comparator 410A or 410B provides a low signal to an input of gate 409B, which in turn applies a low to the input of gate 408B, thereby toggling the flip-flop consisting of gates 408A and 408B in circuit block 248 so that a logic high is applied to both inputs of gate 402G. The output of gate 402G is then low and disables gates 409A and 409C to shut off the transistors of switches SB1 and ST1 for the duration of the pulse. The next succeeding pulse received through the opto-isolator 403B will, through gates 406A and 406B, reset the flip-flop consisting of gates 408A and 408B to its original, normal state.

A bridge enable signal from gate 130D (FIG. 4) passes through opto-isolator 405, which is preferably identical to opto-isolator 403B, and a gate 406C and is presented to an input of gate 409B. When the output of opto-isolator 405 is high, gate 406C will present a low to an input of gate 409B and gate 409B will keep an input of gate 408B low, so that gate 402G will apply a low to the inputs of gates 409A and 409C to keep the transistors of switches SB1 and ST1 shut off.

The charge output from latch 154 (FIG. 4), line 268, is connected to the input of opto-isolator 411, which is preferably an H11A1 integrated circuit manufactured by General Electric. The output of opto-isolator 411 is connected to an input of gate 409C. When line 268 is raised by the microprocessor 100 to indicate that the system is entering "charge" mode, the output of optoisolator 411 will go low and disable gate 409C, such that switch ST1 can never close during charge mode. Switch SB1, however, remains responsive to signals received from gate 130A through opto-isolator 403B and is used to facilitate the charging of battery 250 in a manner described in greater detail hereinafter.

The circuits of bridge drivers 215B and 215C (FIG. 4) are substantially identical to that of 215A, except that an additional connection 229, shown in broken lines in FIG. 6, is provided. Thus, in bridge driver circuits 215B and 215C, when the output of opto-isolator 411 goes low, gate 409B will be disabled and, through gates 408B and 402G, will disable gates 409A and 409C to keep switches SB2 or SB3 and ST2 or ST3, respectively, open at all times during "charge" mode.

Figure 7:
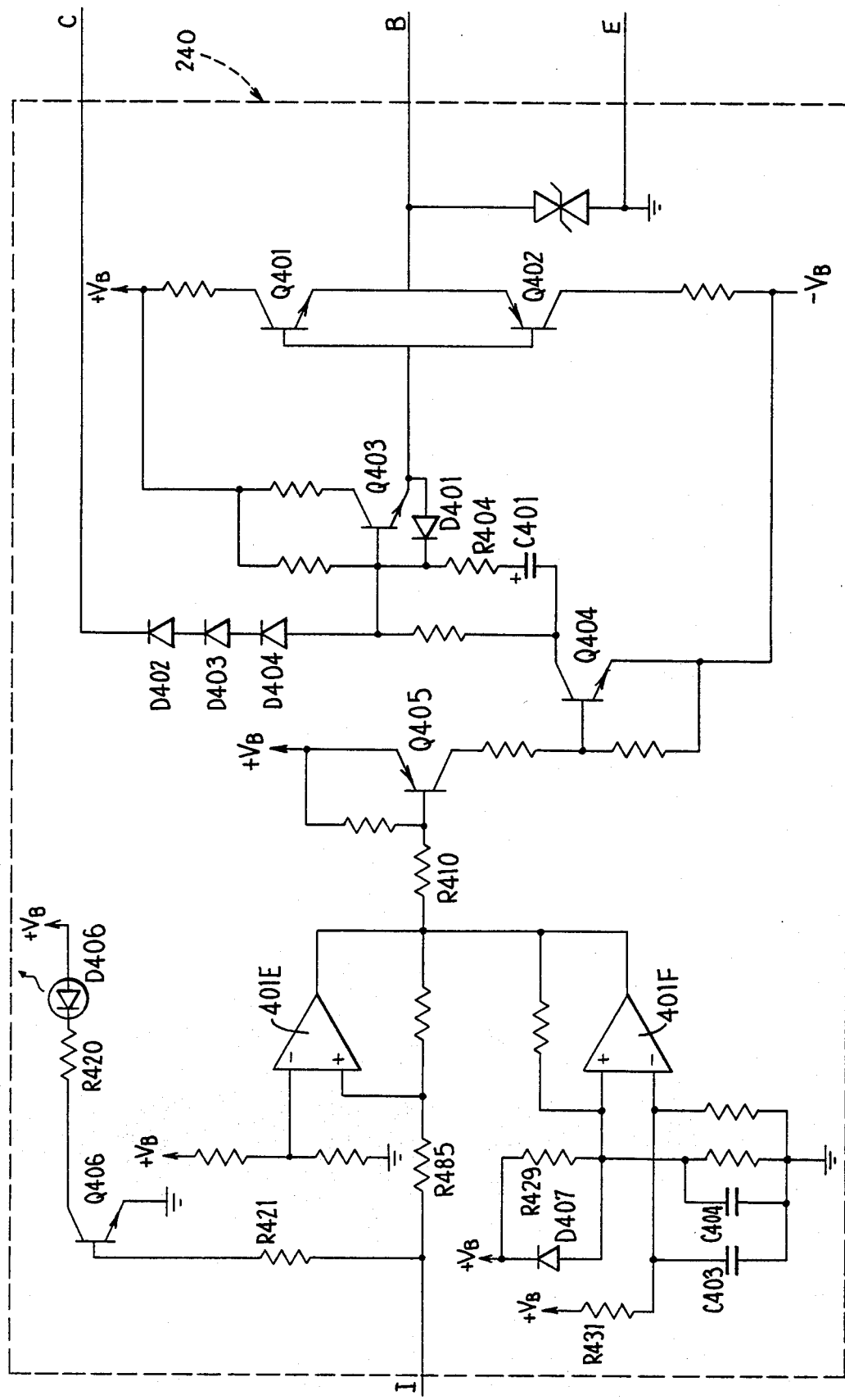
FIG. 7 is a schematic diagram of a circuit which is part of the circuit of FIG. 6.

An exemplary circuit which could be used to implement the base drive circuit 240 of FIG. 6 is illustrated in FIG. 7. The input to base drive circuit 240 (from gate 409A of FIG. 6) is connected through a resistor R421 to a transistor Q406 which, through a resistor R420, drives a light-emitting diode D406 to provide a visual indication of the state of the output of gate 409A for diagnostic purposes.

The output of gate 409A is also connected through a resistor R485 to one input of a comparator 401E which is preferably an LM139 integrated circuit manufactured by National Semiconductor Corporation. A resistive voltage divider applies a fixed reference voltage to the other input of comparator 401E. The output of comparator 401E is connected to the base of a transistor Q405 through a resistor R410. Comparator 401E acts as a current amplifier for the output of gate 409A, providing sufficient current to drive the base input of transistor Q405. Transistor Q405 drives transistor Q404, which in turn controls transistor Q402 through a capacitor C401, a resistor R404 and a diode D401. Transistor Q403 is a slave to transistor Q404 and controls transistor Q401. When transistor Q404 is turned on, it will turn on transistor Q402, thereby lowering the voltage at the base of the transistor of switch SB1 and effectively shutting off switch SB1. When transistor Q404 is turned off, transistor Q403 will automatically turn on and will turn on transistor Q401, thereby raising the voltage at the base of the transistor of switch SB1 and turning switch SB1 on. Diodes D402, D403 and D404 regulate the amount of base current provided to the transistor of switch SB1 to the minimal current required to keep it operating within its range of saturation. More specifically, if the voltage at the collector of the transistor of switch SB1 drops too low, diodes D402–D404 will begin to conduct, thereby altering the current flow to the base of transistor Q403, which in turn will reduce the current supply to the base of the transistor and switch SB1.

Base drive circuit 240 also includes a comparator 401F which is preferably an LM139 integrated circuit manufactured by National Semiconductor Corp. The output of comparator 401F is connected to the output of comparator 401E, and each input of comparator 401F is connected to a respective RC network. Capacitor C404 is preferably substantially larger than capacitor C403 and resistor R429 is preferably substantially larger than resistor R431. Accordingly, capacitor C404 will charge much more slowly at power-up. The output of comparator 401F remains low until capacitor C404 is charged, and thereby overrides the output of comparator 401E and keeps the transistor of switch SB1 turned off until power is stable throughout the system. Diode D407 effects a rapid discharge of capacitor C404 when the system is powered down so that capacitor C404 will be fully discharged when power is again applied to the system.

The base drive circuit 241 of FIG. 6 is preferably identical to the base drive circuit 240 illustrated in FIG. 7.

Figure 8:
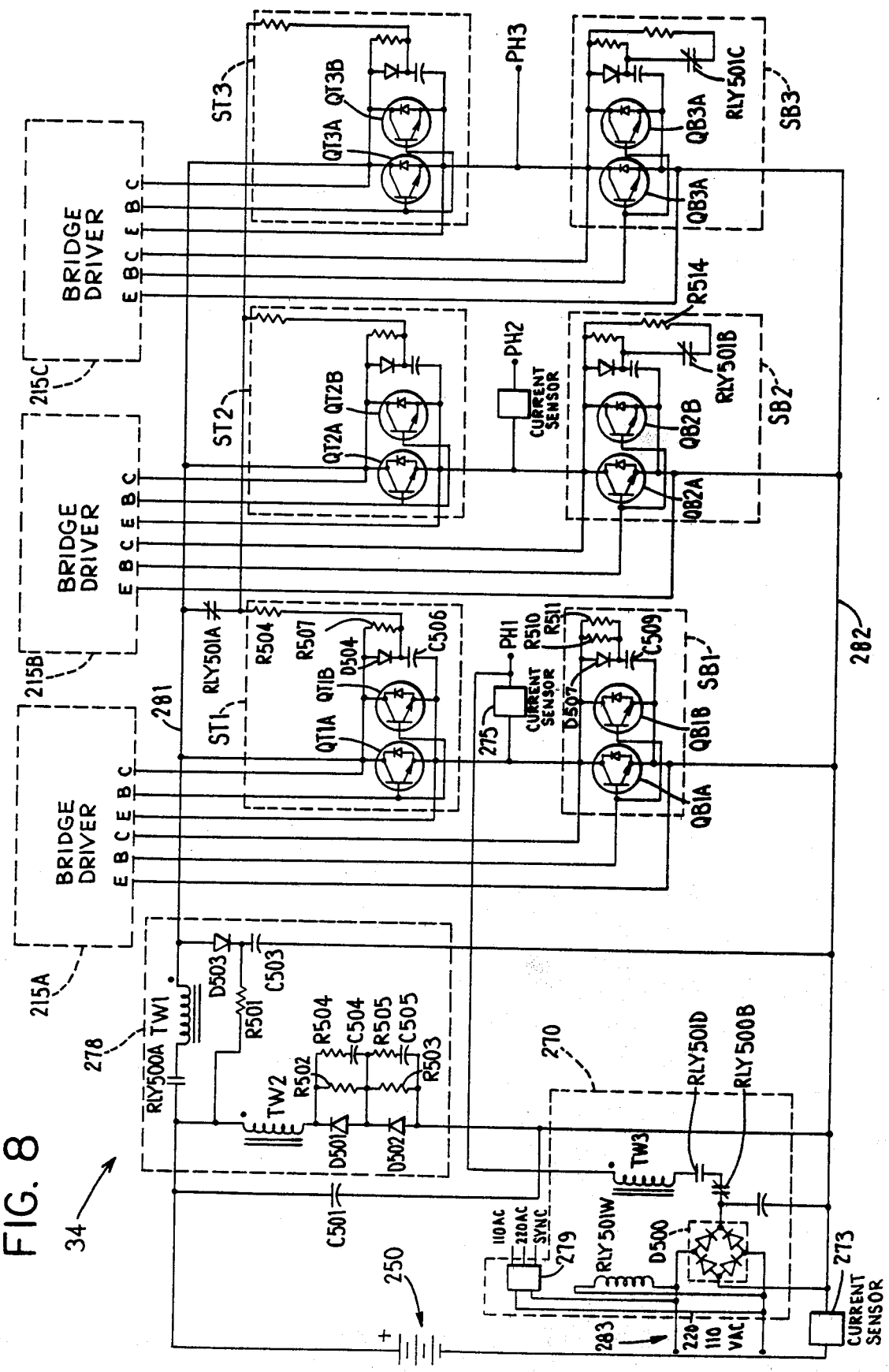
FIG. 8 is a schematic diagram of the inverter of FIG. 2, including a battery charging circuit.

FIG. 8 illustrates in detail the circuitry of the inverter 34 (FIGS. 2 and 4). Switch ST1 includes two transistors QT1A and QT1B which are connected in parallel and are preferably ET-127 transistors available from Fuji Electric Ltd. Switch ST1 also includes a transistor snubber network which consists of a diode D504, a capacitor C506, and resistors R504 and R507. The snubber network is connected across the emitter and collector of transistors QT1A and QT1B and, through a normally closed relay contact RLY501A, to power bus 281. Switches ST2 and ST3 are substantially identical to switch ST1, the snubber networks thereof also being connected to relay contact RLY501A. Switches SB1-SB3 differ slightly from switches ST1-ST3, in that the snubber networks thereof are connected only to the emitter and collector of the associated transistors. The snubber network of switch SB1 includes a diode D507 and capacitor C509 connected in parallel, and two resistors R510 and R511 connected in parallel with diode D507. The snubber networks of switches SB2 and SB3 are similar to that of SB1, except that a respective normally closed relay contact RLY501B and RLY501C is connected in series with one of the resistors.

Figure 8A:
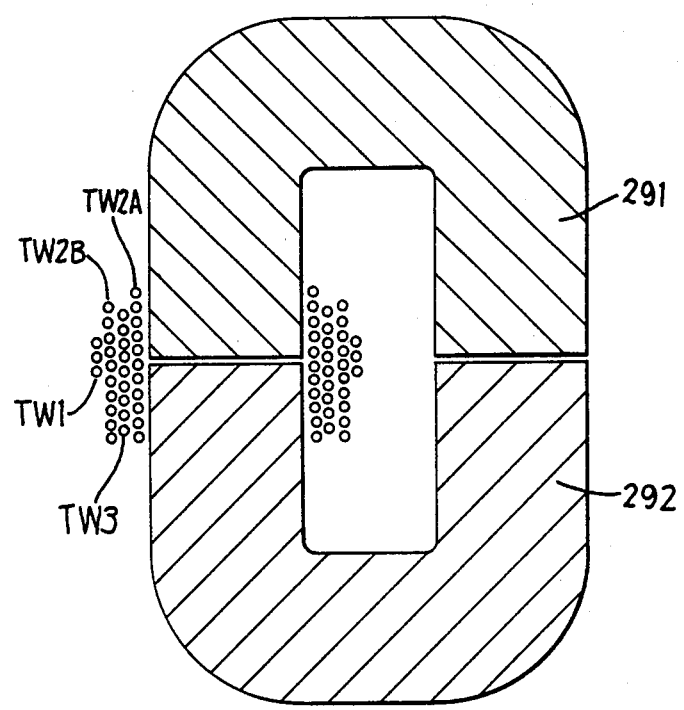
FIG. 8A is a sectional view of a transformer which is a component of the circuit of FIG. 8.

The inverter 34 includes a transformer having three windings TW1, TW2 and TW3. In the preferred embodiment, and as shown in FIG. 8A, the transformer is made from an AH-393 core manufactured by Arnold Engineering, which consists of two C-cores 291 and 292 arranged with the tips of their legs adjacent each other but separated by a gap of about 0.02 inches, thereby forming a substantially O-shaped core assembly. The windings are then made around a respective pair of the adjacent legs of the C-core. Winding TW2 is a two-layer winding made from $7 \times 19 \times 26$ gauge Litz wire, the first layer TW2A being eleven turns wound around the legs of the dual C-core. Winding TW3 is made from the same type of wire, and consists of nine turns which are wound directly on the first layer of winding TW2. The second layer TW2B of winding TW2 consists of ten turns wound onto winding TW3. Winding TW1 is made from magnet wire having 20 #14 strands and consists of three turns wound onto the outer layer of winding TW2.

The positive end of battery 250 is connected to power bus 281 through a normally open relay contact RLY500A and transformer winding TW1. A capacitor C501 is provided to minimize voltage transients on power buses 281 and 282. Relay contact RLY500A is controlled by the ignition switch (not illustrated) of the vehicle and is closed when the ignition switch is turned on, in other words when the system is in "motor" mode. Transformer winding TW1 acts as a choke to limit the current flow through power bus 281 as switches ST1-ST3 or SB1-SB3 turn on. The current which does flow through winding TW1 will cause a certain amount of energy to be stored in that winding as an electromagnetic field. It is important to provide an alternate path to effect a discharge of this energy when switches ST1-ST3 or SB1-SB3 are turned off and interrupt the current flow, in order to prevent the occurrence of excessive voltage transients on power bus 281 which could damage various system components. Transformer winding TW2 provides this alternate current path by serving as an energy recovery winding during "motor" mode, and accepting the energy from transformer winding TW1 and returning it to battery 250. Diodes D501 and D502 are provided in series with transformer winding TW2 to prevent it from appearing as a short circuit across the terminals of battery 250, but facilitate the reverse current flow into the battery which occurs when transformer winding TW2 accepts energy from transformer winding TW1. In the preferred embodiment, two diodes are used in series in order to allow for high voltage peaks which occur on winding TW2 when switches ST1-ST3 and SB1-SB3 are turned on, due to the high ratio of turns between TW1 and TW2. Resistors R504 and R505 and capacitors C504 and C505 form a conventional diode snubber network for the diodes D501 and D502. Resistors R502 and R503 ensure that diodes D501 and D502 will have equal voltage drops thereacross at all times. Diode D503, resistor R501 and capacitor C503 are provided to prevent voltage transients by recovering leakage energy from the transformer winding TW1 which is emitted when switches ST1-ST3 or SB1-SB3 turn off, due to practical limitations in the coupling between windings TW1 and TW2. In "charge" mode, diode D503, resistor R501 and capacitor C503 provide transient voltage protection for switch SB1 through the internal diodes in transistors QT1A and QT1B of switch ST1.

When the driver parks the vehicle and turns off the ignition key, relay contact RLY500A will open, thereby disconnecting power bus 281 from the positive end of battery 250, and also closing relay contact RLY500B in the charge circuitry 270. When the vehicle driver thereafter connects the terminals 283 of the charge circuitry 270 to a 110 or 220 volt AC source, such as a standard home power outlet, the system will enter "charge" mode. The relay winding RLY501W will be energized and will cause contacts RLY501A, RLY501B and RLY501C to open, thereby disconnecting the snubber networks for switches ST1-ST3 from the power bus 281 and disabling the snubber networks of switches SB2 and SB3 in order to prevent currents from circulating through the windings of AC motor 28 (FIG. 4) as switch SB1 is used to charge battery 250. Providing a small relay in this manner to disable the snubber networks avoids the need to provide large contactors to disconnect the inverter from the motor phase inputs. Relay winding RLY501W will also cause relay contact RLY501D to close to connect a diode network D500 to transformer winding TW3.

Circuit block 279, which contains conventional circuitry, monitors the amplitude of the AC waveform at terminals 283 and provides a signal 110AC or 220AC to the microprocessor 100 through input buffers 153A and 153B (FIG. 4) to indicate that a source of AC power has been connected to terminals 283 and to indicate the voltage of the power source. The microprocessor 100 will respond by entering "charge" mode, shutting off switches SB2, SB3 and ST1-ST3, and turning switch SB1 on and off at a frequency substantially greater than 120 Hz. The circuit 279 also produces a pulse on a SYNC line at each zero-crossing of the AC wave, namely at the 0° and 180° points of the sinusoidal waveform. The 110 or 220 volt AC waveform will typically have a frequency of 60 hertz, and the waveform produced on the SYNC line will therefore have a frequency of 120 hertz. The SYNC line is connected to a trigger input of the pulse stretcher 128 (FIG. 4) for reasons discussed in detail hereinafter.

The charge circuit 270 includes the diode network D500 which fully rectifies the incoming AC waveform. As mentioned above, the microprocessor 100 will have instructed inverter control unit 38 (FIG. 2) to turn switch SB1 on and off at a rate substantially greater than 120 hertz. When switch SB1 is on, current will flow through transformer winding TW3 and transistors QB1A and QB1B, and energy will build up in transformer winding TW3 in the form of an electromagnetic field. When switch SB1 is turned off, transistors QB1A and QB1B will interrupt the circuit which includes winding TW3, such that the energy stored in transformer winding TW3 cannot escape from transformer winding TW3 in the form of current. Instead, transformer winding TW2 again serves as an energy recovery winding, accepting the energy from transformer winding TW3 and converting it into a reverse current into the battery 250, thereby recharging the battery 250.

Due to the fact that the voltage of the rectified signal from diode network D500 varies with time, if the time interval within which switch SB1 is turned on is constant, the amount of energy stored in transformer winding TW3 will vary with time and, at the peak of the rectified 220 volt AC waveform, might be sufficiently excessive to damage the transformer or other circuit components. Accordingly, it is desirable that the amount of energy stored in winding TW3 be controllable. This is effected by varying the amount of time switch SB1 is turned on in a manner synchronized to the fully rectified AC waveform produced by diode network D500.

Figure 9:
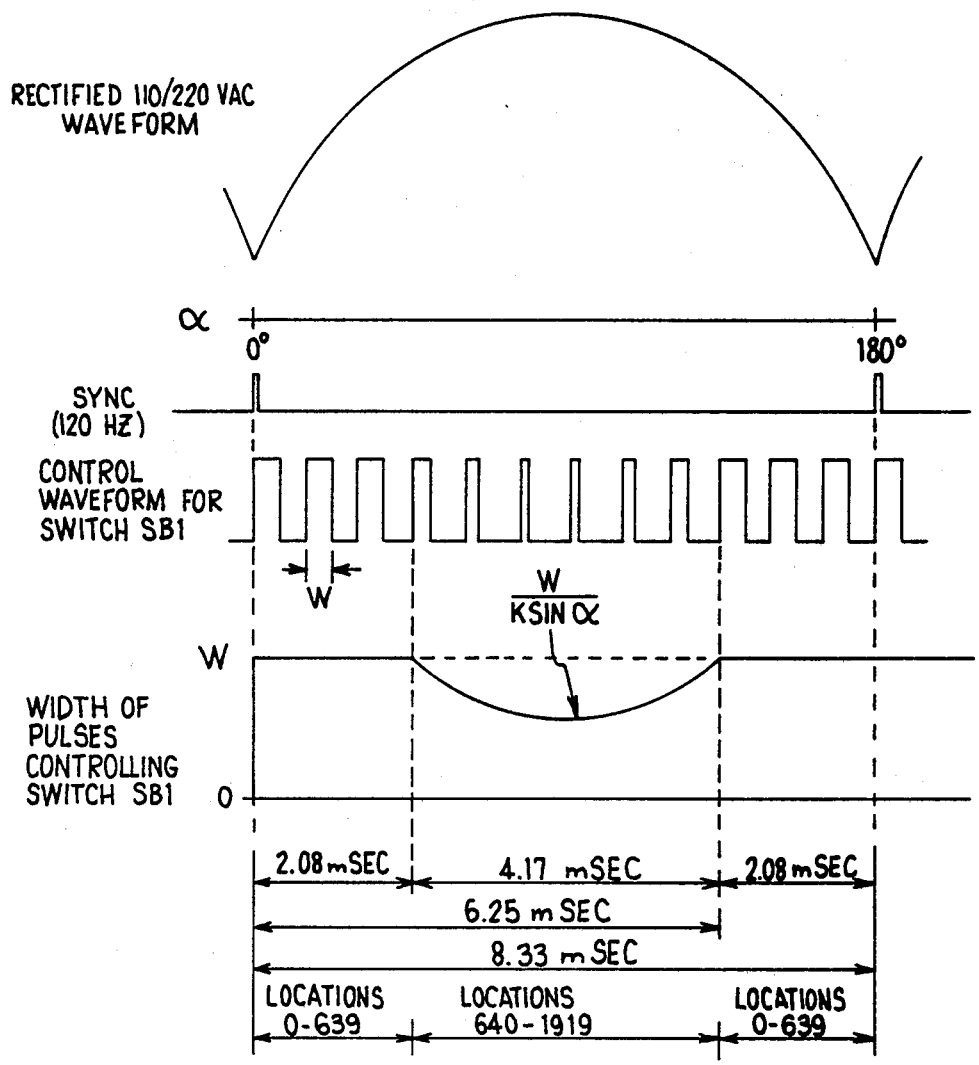
FIG. 9 is a diagram illustrating a technique of pulse width modulation used by the circuit of FIG. 2 to control the battery charging circuit of FIG. 8.

More specifically, as shown in FIG. 9, the microprocessor 100 sets up the switching control waveform for switch SB1 so that switch SB1 is turned on for shorter periods of time during peaks of the rectified AC waveform and at other times is on for substantially constant longer periods of time. In other words, as shown in FIG. 9, the width of the switching command pulses is substantially a constant W, except during the peak of the rectified AC waveform, when the width of the pulses is narrowed by a factor of $1/K\sin\alpha$, where $\alpha$ relates to the rectified AC waveform, as shown in FIG. 9. While these pulses are being varied as a function of $1/K\sin\alpha$, the energy stored in transformer winding TW3 (FIG. 8) during each pulse will be substantially constant. The normal pulse width W may be selected by the microprocessor 100 on the basis of parameters such as the voltage of the AC source, the battery voltage and temperature, and so forth. Thus, microprocessor 100 might gradually reduce the normal pulse width W as the battery becomes more fully charged and less energy needs to be supplied to it.

As explained hereinabove with respect to FIG. 4, when the microprocessor 100 uses latch 154 to raise line 268 and thereby indicate that "charge" mode is being entered, the 307.2 Khz output of flip-flop 106B will be selected by gates 150A–150D to serve as the clock for the circuitry controlling master RAM 120. When the address counter 127 is incremented at this rate, the maximum count detector 113B will detect the maximum count of 1920 after approximately 6.25 msec. As shown in FIG. 9, however, each half wave of the rectified AC wave form is approximately 8.33 msec long. Accordingly, as shown in FIG. 9, if the sequential accessing of the locations in the master RAM 120 begins at the start of a half wave of the rectified AC waveform, all of the words from the master RAM 120 will have been read out at a point in time approximately 2.08 msec before the end of the half wave. The control of switch SB1 during this remaining 2.08 msec of the rectified half wave is therefore effected in the following manner.

The microprocessor 100, using buffer RAM 114 in the manner described hereinabove, loads master RAM 120 with 1920 control words. As indicated in FIG. 9, locations 0–639 correspond to the first 2.08 msec of the half wave and are loaded with a bit sequence which will effect pulses of substantially equal width. Locations 640–1919 correspond to the next 4.17 msec of the half wave and are loaded with a bit sequence which will cause the pulse widths to vary as a function of $\sin\alpha$ in the manner described hereinabove.

Referring to FIGS. 4 and 9, a pulse on the SYNC line occurs at a zero-crossing of the AC waveform and triggers pulse stretcher 128, causing pulse stretcher 128 to clear address counter 127. Address counter 127 will thus be initially addressing location 0 of the master RAM 120 and will thereafter be incremented at a rate of 307.2 Khz, so that the locations of master RAM 120 are successively read out at this rate. Address counter 127 will therefore reach its maximum count of 1920 approximately 6.25 msec after the SYNC pulse occurred, at which time the maximum count director 113B will trigger the pulse stretcher 128 and effect another clear of the address counter 127. The address counter 127 will therefore be addressing location zero again and will be incremented at the rate of 307.2 Khz. Therefore, during the remaining 2.08 msec of the rectified half wave, locations 0–639 of the master RAM 120 will again be read out, thereby producing a bit sequence defining pulses of constant width to control the switch SB1. Another pulse will occur on the SYNC line at the end of the half wave, triggering the pulse stretcher 128 again and clearing address counter 127 again, whereby the entire cycle just described will repeat.

It will be recognized that the battery charging arrangement just described is not limited to use with an AC induction motor, but could be used in other applications, for example in a circuit controlling a DC motor.

FIG. 10 illustrates a preferred flow for the program for the microprocessor 100. Following a power-up and/or reset at block 301, the program enters a software block 302 which performs certain initialization tasks. Relevant diagnostic and alarm routines are then performed at block 303, and at block 304 the software places on address bus 211 (FIG. 4) an address which will cause decoder 103B to lower line 221 and retrigger the watchdog 104. The microprocessor 100 will then progress to block 304 and read in the signals 110AC and 220AC through buffers 153A and 153B (FIG. 4), in order to determine whether an AC source has been connected to the vehicle to effect recharging of the battery 250 and, if so, what the voltage of the source is. If an AC source has been connected, the microprocessor progresses to block 306 where it enters the "charge" mode and uses latch 154 to raise line 268 if it is not already high in order to indicate to the rest of the system that "charge" mode has been entered. The microprocessor 100 will then read appropriate inputs through the analog to digital converter and multiplexer 152 and will calculate an appropriate notch waveform of the type discussed above in connection with FIG. 9. The microprocessor 100 will then progress to block 309 and check the state of the output of gate 132A (FIG. 4) through buffer 173 in order to determine whether the buffer RAM 114 is available. The buffer RAM 114 will be available unless it was recently loaded with a new set of data words and the transfer of these data words to the master RAM 120 is still in progress. If the buffer RAM 114 is not available, program control will be returned to block 303. If the buffer RAM 114 is available, the microprocessor 100 will translate the notch waveform into a sequence of 1920 bits to control switch SB1, will load these bits into the respective 1920 locations in the buffer RAM 114, will use decoder 103B to set the flip-flop consisting of gates 132A and 132B in order to initiate the transfer of the data from the buffer RAM 114 to master RAM 120, and will transfer program control to block 303.

If the microprocessor 100 determined at block 305 that a source of AC power was not connected to the vehicle, it would have progressed to block 311 and entered "motor" mode, using latch 154 to lower line 268 if it is not already low in order to indicate to the remainder of the system that "motor" mode has been entered. The microprocessor 100 then reads inputs from the analog to digital converter and multiplexer 152 and calculates the torque demand. The exact manner in which torque demand is calculated may vary in different systems, based on factors such as characteristics of the particular model of AC motor used and the environment in which it is used. In the preferred embodiment, torque demand is determined primarily as a function of the position of the vehicle's accelerator pedal and/or brake pedal and, at block 314, certain minor adjustments may be made to the torque demand on the basis of other factors. For example, the program may limit torque demand to a predetermined maximum value, so that if the driver suddenly pushes the accelerator pedal all the way down, the system will respond rapidly but smoothly by applying the large demand for increased torque incrementally over a period of time. Other parameters, such as the temperature of the battery 250 and motor 28 may also be used to adjust the torque demand slightly.

Once the adjusted torque demand has been determined, the microprocessor 100 will refer to the most recent determination of rotor speed obtained using speed measuring circuit 136 and will use the equations and theory discussed hereinabove to calculate the requisite stator frequency and the three phases of notch waveforms for the motor 28. At block 318, the microprocessor 100 then checks to see whether the buffer RAM 114 is available. If the buffer RAM 114 is not available, program control will be returned to block 303. If the buffer RAM is available, the microprocessor 100 digitizes the waveforms and loads them into the buffer RAM 114, uses decoder 103B (FIG. 4) to reverse the state of the flip-flop consisting of gates 132A and 132B in order to initiate a transfer of the data from the buffer RAM 114 to the master RAM 120, and uses the new stator frequency to adjust control of the programmable timer 100D in order to change the frequency of the waveform produced on line 214. Program control is then returned to block 303.

Although a particular preferred embodiment of the invention has been disclosed in detail for illustrative purposes, it will be recognized that variations or modificiations of the disclosed apparatus, including the rearrangement of parts, lie within the scope of the present invention.

The embodiments of the invention is which an exclusive property or privilege is claimed are defined as follows:

1. A method of generating m pulse width modulated waveforms, each having an average voltage which varies sinusoidally at a first frequency and being applied to a respective phase input of an m-phase AC induction machine, comprising the steps of:
   generating a carrier waveform which is square wave pulse train at a second frequency which is 3N times said first frequency, N being an integer and the pulses of said carrier waveform being of equal width;
   selecting a reference point on said carrier waveform and evaluating the function sin $\theta$ at the center of each pulse of said carrier waveform, where $\theta$ is the angular displacement of said pulse center from said reference point at said first frequency;
   modulating the width of each said pulse by moving the leading and trailing edges thereof through equal angular displacements in opposite directions, each edge of each said pulse being moved an angular distance proportional to Ksin $\theta$, where sin $\theta$ is the value determined for such pulse according to the preceding step and K is a predetermined value, the leading and trailing edges of each pulse being moved away from each other when sin $\theta$ is positive and toward each other when sin $\theta$ is negative;
   applying to one said input of said AC induction machine said modulated carrier waveform and applying to the remaining said inputs of said AC induction machine respective waveforms which are identical to said modulated carrier waveform but are shifted in phase with respect thereto by respective angular displacements at said first frequency which are successive integer multiples of 360°/m.

2. The method of claim 1, wherein said AC induction machine has three phases.

3. The method of claim 1, wherein said reference point is located at the leading edge of a said pulse of said carrier waveform.

4. An apparatus for controlling an m-phase AC induction machine, comprising:
   a source of DC power;
   an inverter cooperable with said DC power source and said AC machine, said inverter having m switching means for alternatingly connecting respective phase inputs of said AC machine to respective terminals of said DC power source; and
   control means cooperable with said inverter for generating a control signal for each said switching means from a carrier waveform which is a pulse train at a first frequency which is 3N times a second frequency, N being an integer and the pulses of said carrier waveform being of equal width, said control means including means for modulating the width of each said pulse by moving the leading and trailing edges thereof through equal angular displacements in opposite directions, each edge of each pulse of said carrier waveform being moved an angular distance proportional to Ksin $\theta$, where $\theta$ is the angular displacement at said second frequency of the center of such pulse from a reference point on said carrier waveform and K is a predetermined value, the leading and trailing edges of each said pulse being moved away from each other when sin $\theta$ is positive and toward each other when sin $\theta$ is negative, and including means for supplying to one said modulated carrier waveform and for supplying to the remaining said switching means respective said control signals which are identical to said modulated carrier waveform but are shifted in phase with respect thereto by respective angular displacements which are successive integer multiples of 360°/m at said second frequency.

5. The method of claim 1, wherein N is equal to 4, said second frequency being twelve times said first frequency.

* * * * *